United States Patent
Chu

(10) Patent No.: US 9,395,919 B1
(45) Date of Patent: Jul. 19, 2016

(54) MEMORY CONFIGURATION OPERATIONS FOR A COMPUTING DEVICE

(71) Applicant: Advanced Micro Devices, Inc., Sunnyvale, CA (US)

(72) Inventor: Hsiu-Ming Chu, Taipei (TW)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 0 days.

(21) Appl. No.: 14/618,187

(22) Filed: Feb. 10, 2015

(51) Int. Cl.
*G06F 12/00* (2006.01)
*G06F 3/06* (2006.01)

(52) U.S. Cl.
CPC ............ *G06F 3/0604* (2013.01); *G06F 3/0632* (2013.01); *G06F 3/0673* (2013.01)

(58) Field of Classification Search
CPC .... G06F 3/0604; G06F 3/0632; G06F 3/0673
See application file for complete search history.

(56) References Cited

U.S. PATENT DOCUMENTS 9,142,280 B1 * 9/2015 Pandey ............ G11C 11/40615

\* cited by examiner

*Primary Examiner* — Shawn X Gu
(74) *Attorney, Agent, or Firm* — Park, Vaughan, Fleming & Dowler LLP

(57) ABSTRACT

In the described embodiments, a computing device executes firmware to perform a startup initialization operation, wherein performing the startup initialization operation comprises setting an operating state of a memory in the computing device to a default low performance memory operating state. After completing the startup initialization operation, the computing device executes an operating system, wherein executing the operating system comprises performing a memory test to determine a high performance memory operating state. The computing device then sets one or more memory configuration values based on the high performance memory operating state, the one or more memory configuration values controlling the operation of the memory.

20 Claims, 2 Drawing Sheets

MEMORY CONFIGURATION OPERATIONS FOR A COMPUTING DEVICE

BACKGROUND

1. Field

The described embodiments relate to computing devices. More specifically, the described embodiments relate to memory configuration operations for computing devices.

2. Related Art

Computing devices typically perform operations for establishing an operating state of the computing device upon being started up (e.g., plugged in, switched on, restored from a low-power state, etc.). For example, at start-up, a processor in many computing devices performs what is known as a power on self test (POST), during which the processor executes firmware known as basic input/output system (BIOS) to initialize and test hardware components (processor core(s), memory, mass-storage devices, peripherals, etc.) and establish a low-level operating state of the computing device. After performing the initialization and testing operations, the BIOS typically directs the processor to begin executing software such as an operating system or a boot loader, which establishes a high-level operating state to prepare the computing device for subsequent use. For example, an operating system may perform further initialization and tests, start services/routines, launch programs/applications, etc.

In many computing devices, during the POST, testing is performed on a main memory (or, more simply, "memory") in the computing device to establish an operating state for the memory. Generally, the operating state for the memory includes various parameters for the memory such as memory operating speed, data and control signal timing, etc. During the testing, the processor interacts with the memory to determine a highest performance memory operating state that can be reliably supported by the memory (i.e., a memory operating state with the fastest speed, lowest access times, etc.). For example, in some of these computing devices, for a set of potential memory operating speeds, the processor sets the memory to each of the potential operating speeds (and may set other operating parameters) and performs various memory access operations (writes, reads, etc.) to determine whether the memory can be reliably operated at the corresponding potential operating speed. Upon determining a highest speed at which the memory can be reliably operated, and thus the highest performance operating state, the processor sets computer system state to indicate the highest performance memory operating state. The computing device can then use the system state when operating the memory. For example, the computing device can selectively set the memory to the highest performance memory state within power, bandwidth, etc. constraints.

Because the computing devices perform numerous other operations in addition to testing the memory during the POST, the POST in some computing devices takes a sufficiently long time to annoy a user waiting for the device to finish starting up so that the computing device can be used.

BRIEF DESCRIPTION OF THE FIGURES

Throughout the figures and the description, like reference numerals refer to the same figure elements.

DETAILED DESCRIPTION

Figure 1:
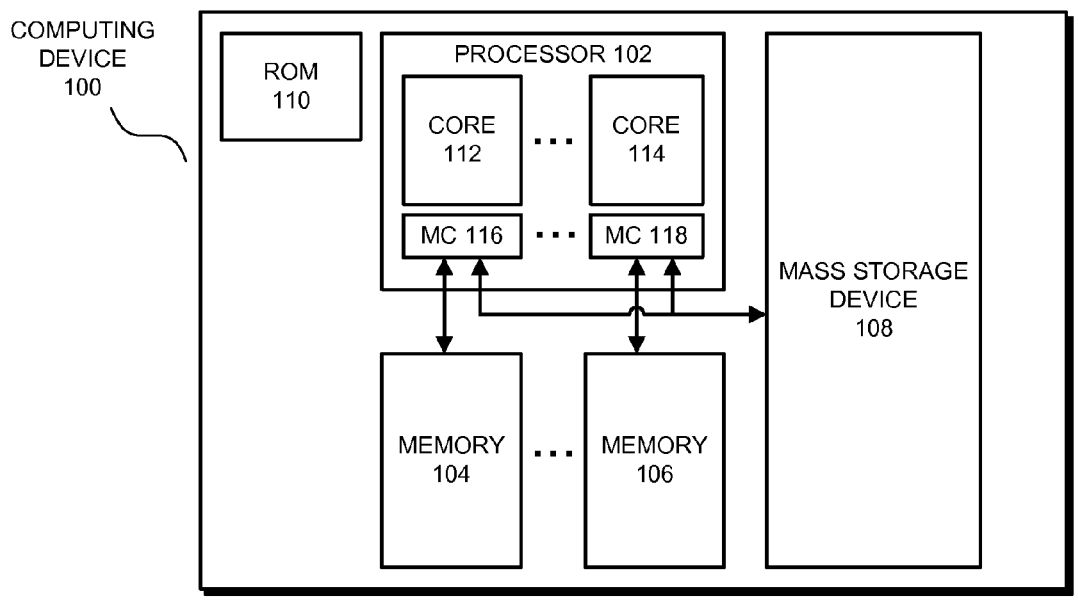
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Overview

In the described embodiments, a computing device avoids performing a memory test to determine a high performance operating state of a memory during a power on self-test (POST) operation. In order to avoid performing the memory test, the computing device sets the memory to a default low performance memory operating state during the POST operation without performing the memory test. Generally, the low performance memory operating state uses memory operating speeds, interface bus speeds, data/control signal timing, delays, and/or other operating parameters for which the memory is expected to operate reliably (where "operate reliably" means to operate within specified ranges for accuracy, errors, and/or other criteria). Then, after the POST operation is completed, an operating system, a driver, and/or another software routine in the computing device performs the memory test during or after an operating system start-up. Based on the outcome of the memory test, the operating system, the driver, and/or the other software routine configures the computing device to enable a high performance memory operating state. Generally, the high performance memory operating state uses the best available values for memory operating speeds, interface bus speeds, data/control signal timings, delays, and/or other operating parameters for which the memory has been determined to operate reliably during the memory test. In some embodiments, the "best available" values used for the high performance memory operating state enable the memory to have faster, more efficient (in terms of latency), etc. operation in comparison to the low performance memory operating state—and may be the best values supported by the computing device (e.g., highest memory clock speed, highest memory bus speed, etc.) that are also supported by the memory.

In some embodiments, the operating system, the driver, and/or the other software routine sets one or more computing device state values to enable a memory controller and/or other mechanisms in the computing device to configure the memory in the high performance memory operating state. For example, the operating system, the driver, and/or the other software routine may update values in one or more state registers to indicate a highest permissible memory clock speed (and thus "memory speed"), a maximum interface bus speed, optimal data/signal timing, and/or other values. The memory controller and/or other mechanisms in the computing device then use the values to when configuring the memory's operating state.

In some embodiments, the memory controller and/or other mechanisms are not required to configure the memory in the high performance memory operating state. Instead the memory may be selectively configured in the high performance memory operating state. For example, in some embodiments, the memory controller determines whether one or more criteria such as memory system demand, power consumption requirements, business of one or more processor cores, etc. is met before configuring the memory in the high performance state.

In some embodiments, the memory test is performed by a processor executing basic input/output (BIOS) code. For example, in some embodiments, the operating system, the driver, and/or the other software routine causes (asserts, triggers, etc.) a system management interrupt (SMI) that causes a processor in the computing device to switch to a system management mode. In the system management mode, the processor executes BIOS code that causes the processor to perform the above-described memory test. In these embodiments, the processor sets the one or more computing device state values to enable a memory controller and/or other mechanisms in the computing device to configure the memory in the high performance memory operating state during the memory test based on executing the BIOS code. After the processor completes the memory test, the processor passes control back to the operating system, the driver, and/or the other software routine (e.g., executes code for the operating system). In some of these embodiments, the operating system may cause the SMI based on a request from the driver and/or other software routine.

In some embodiments, the memory test is performed by a processor executing code for an operating system, a driver, and/or other software routine. In these embodiments, the operating system, the driver, and/or the other software routine include program code that causes the processor to perform the above-described memory test. In these embodiments, the program code for the driver and/or other software routine may be executed during or after operating system start-up operations. Note that, in embodiments where the operating system, the driver, and/or the other software routine perform the memory test, the processor may not execute BIOS code to perform the memory test (i.e., the driver and/or other software routine is responsible for performing the memory test, setting computing device state values, etc.).

By performing the memory test as described above, the described embodiments avoid the memory test being performed during the POST operation, which can increase the speed at which the POST operation is performed. This can, in turn, result in the computing device starting up more quickly (i.e., reaching operating system start-up more quickly) than a computing device in which the memory test is performed during the POST operation. By starting more quickly, the computing device can appear faster to a user of the computing device, which increases user satisfaction.

Computing Device

FIG. 1 presents a block diagram illustrating a computing device 100 in accordance with some embodiments. As can be seen in FIG. 1, computing device 100 includes processor 102, memories 104-106, mass storage device 108, and read-only memory ("ROM") 110. Processor 102 is a functional block that performs computational operations in computing device 100. Processor 102 includes two cores 112-114, each of which comprises one or more central processing units (CPUs), graphics processing units (GPUs), accelerated processing units (APUs), embedded processors, application specific integrated circuits (ASICs), and/or other computational mechanisms. Processor 102 also includes memory controllers ("MC") 116-118, which are described in more detail below.

Memories 104 and 106 are volatile memories that function as the main memory of computing device 100, storing data (which can comprise instructions, general data, etc.) for other functional blocks in computing device 100. Memories 104 and 106 include memory circuits such as one or more of SDRAM (DDR4, DDR3, etc.), GDDR (GDDR5, GDDR3, etc.), and/or other types of volatile memory circuits, as well as control circuits for handling accesses of the that are stored in the memory circuits. In some embodiments, memories 104 and 106 are configured to store different portions of a same address space in computing device 100, e.g., with memory 104 storing data at addresses in a first portion of the address space and memory 106 storing data at addresses in a second portion of the address space.

Memory controllers 116 and 118 perform operations for handling interactions between processor 102 and the corresponding memory 104-106. For example, memory controller 116 handles interactions with memory 104 such as reading data from and writing data to memory 104 on behalf of processor 102, controlling the memory circuits in memory 104, performing virtual address to physical address translation, etc. Memory controller 118 does the same for memory 106. As described herein, in some embodiments, memory controllers 116 and 118 are used by operating system 200 and/or other software entities in computing device 100 (see FIG. 2) for performing memory tests.

Mass storage device 108 is a non-volatile memory that functions as mass storage for data in computing device 100. Mass storage device 108 includes one or more optical drives, magnetic drives, high-capacity non-volatile semiconductor memories, and/or other storage devices. Generally, data is retrieved from mass storage device 108 and stored in memory 104-106 to enable processor 102 to access the data.

Read-only memory 110 is a functional block stores program code for execution by other functional blocks in computing device 100. Read-only memory 110 includes memory circuits such as non-volatile semiconductor memory circuits (flash, etc.), programmable read-only memory circuits (PROM), battery-backed up volatile semiconductor memory circuits (DRAM, etc.), etc. In some embodiments, read-only memory 110 stores BIOS code that is executed by processor 102 (i.e., by one or more of cores 112-114) as computing device 100 is performing a POST operation and/or performing a memory test, as described herein.

In some embodiments, communication paths (that include one or more busses, wires, and/or connections) are coupled between the various functional blocks in computing device 100 (processor 102, memory 104, etc.), as shown by arrow-headed lines between the functional blocks. The communication paths are used to transmit commands, data, event notifications, and/or other information between the functional blocks.

Although computing device 100 is described with a particular arrangement of functional blocks, some embodiments include a different number and/or arrangement of functional blocks. For example, some embodiments have multiple processors and/or a different number of cores (1, 4, etc.), as shown by the ellipsis in FIG. 1. As another example, some embodiments have a different number or arrangement of memories and/or memory controllers, such as one memory controller controlling one or more memories, as shown by the ellipsis in FIG. 1. As another example, in some embodiments, computing device 100 includes a number of cache memories. Generally, the described embodiments can use any number or arrangement of functional blocks that can perform the operations herein described.

In addition, although computing device 100 is simplified for illustrative purposes, in some embodiments, computing device 100 includes additional functional blocks or elements for performing the operations herein described and/or other operations. For example, computing device 100 may include power controllers, batteries, media processors, communication mechanisms, networking mechanisms, display mechanisms, etc. Generally, the described embodiments can use any number or arrangement of functional blocks and/or elements that can perform the operations herein described.

Computing device 100 can be, or can be included in, any electronic device that performs computational operations. For example, computing device 100 can be, or can be included in, electronic devices such as desktop computers, laptop computers, wearable computing devices, tablet computers, smart phones, servers, set-top boxes, network appliances, toys, audio-visual equipment, home appliances, controllers, automobiles/trucks, etc., and/or combinations thereof.

Software Entities

Figure 2:
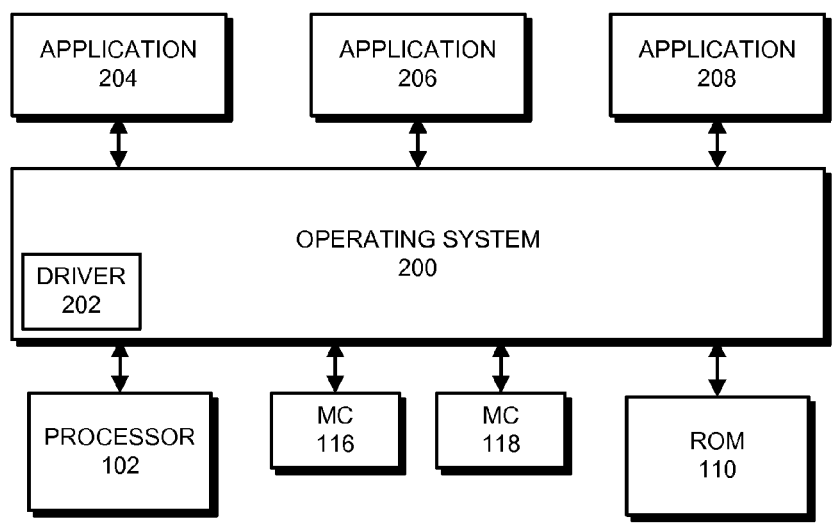
FIG. 2 presents a block diagram illustrating software entities in accordance with some embodiments.

In some embodiments, computing device 100 includes various software entities (e.g., an operating system, firmware, drivers, software routines, and/or other software entities) that perform startup operations for establishing an operating state of computing device 100. FIG. 2 presents a block diagram illustrating software entities in accordance with some embodiments. As shown in FIG. 2, the software entities for computing device 100 include operating system 200, driver 202, and applications 204-208.

Generally, operating system 200 includes program code that serves as an intermediary between system hardware in computing device 100 (e.g., processor 102, memory controllers 116-118, etc.) and applications executed by processor 102, such as applications 204-208 (which can be, for example, an office productivity application, a web browser, and a game application). For example, operating system 200 can be, but is not limited to being, the Windows operating system from Microsoft, Inc. of Redmond, Wash.; the OS X operating system from Apple Inc. of Cupertino, Calif.; or another operating system. Aside from operations for memory testing herein described, operating systems and their general functions are known in the art and hence are not described in detail.

Driver 202 is a software driver program that functions as an intermediary between operating system 200 and memory controllers 116-118. Generally, driver 202 presents a software interface that operating system 200 uses to interface with memory controllers 116-118, the interface enabling operating system 200 communicate with memory controllers 116-118. Using the interface provided by driver 202, operating system 200 can perform operations such as invoking various functions of memory controllers 116-118, receiving information (interrupts, messages, data, etc.) from memory controllers 116-118, etc. In some embodiments, at least some of the operations for performing the memory test described herein are performed by driver 202. For example, in some embodiments, driver 202 includes program code for performing the memory test without relying on other software in computing device 100 (e.g., without using the BIOS to perform the memory test). As another example, in some embodiments, driver 202 calls one or more other pieces of software, such as a BIOS or another software routine, to perform some or all of the operations of the memory test. Generally, driver 202 can include program code that is configured to cause and/or perform the operations for the memory test.

In some embodiments, driver 202 executes in a "kernel mode," with permissions commensurate with being executed as being part of a kernel, or lowest/most privileged level, of operating system 200. In other embodiments, driver 202 driver 202 executes in a "user mode," with driver 202 being executed in the user space of operating system 200 with permissions similar to applications 204-208—i.e., at a higher/less privileged level of operating system 200. However, for simplicity of illustration, driver 202 is shown within operating system 200 (i.e., as if executing in kernel mode).

Although driver 202 is described herein as performing the operations for the memory test, in some embodiments, one or more other software entities performs some or all of the operations described herein as being performed by driver 202 (i.e., instead of driver 202). For example, in some embodiments, operating system 200 performs some or all of the operations for the memory test. As another example, in some embodiments, a "software routine" performs some or all of the operations for the memory test. Generally, a software routine (not shown in FIG. 2) can be any software present in computing device 100. For example, in some embodiments, the software routine is a program or application, a daemon, a script, a method, etc.

Although a particular arrangement of software entities is shown in FIG. 2, in some embodiments, different arrangements and types of software are present in computing device 100. For example, as described above, driver 202 may execute in user space and thus may be shown outside of operating system 200. Generally, the described embodiments include sufficient software entities to perform the operations herein described.

Memory Test

As described herein, driver 202, operating system 200, and/or another software routine performs a memory test to establish a profile for memory 104-106 in computing device 100. In some embodiments, the actual performance of the memory test comprises setting one or more configuration values for the memory and operating the memory with the one or more configuration values set to determine whether the memory operates reliably. Generally, the configuration values can be any values or combination of values that can be used to configure the memory and/or determine the reliable operation of the memory. For example, in some embodiments, the configuration values comprise an operating speed of the memory as set by a clock, control signal, enable signal, and/or other signal(s) that are provided to the memory to control the memory's operating speed.

In some embodiments, performing the memory test comprises, with the one or more configuration values set, performing one or more writes of data in the memory, reads of data in the memory, and/or other operations based at least in part on interactions with the memory. Results from performing the operations are collected and a determination is made whether the operations were performed within specified ranges for accuracy, errors, and/or other criteria based on the results (and thus the memory operates "reliably"). For example, a determination may be made whether a data value was written to a location in the memory and then the same data value was successfully read back from the location in the memory.

In some embodiments, during the memory test, a profile is generated for the memory. Generally, the profile includes information about the memory test, the information indicating how the memory operated with the configuration values set as described above. The profile can include unprocessed result values from the memory test (e.g., event times, flight/delay times on a memory bus, round-trip times, data error counts/ratios, etc.) and/or information generated from the result values (e.g., aggregate values, summary statistics, pass/ fail indicators, etc.). The profile may also include or be used to derive best available configuration values for the memory. In some embodiments, the "best available" values are configuration values for which the memory has faster, more efficient (in terms of latency), etc. operation in comparison to the low performance memory operating state, but for which the operation of the memory is also reliable as described herein. In some embodiments, the best available values are the optimal values supported by the computing device (e.g., highest memory clock speed, highest interface bus speed, etc.) at which the memory operates reliably.

In some embodiments, each of multiple configuration values are tested during the memory test. In these embodiments, performing the memory test includes setting one or more configuration values to each value from a set of values and operating the memory for each setting to determine whether the memory operates reliably. For example, using the operating speed of the memory as the configuration value, performing the memory test comprises, for each memory testing speed in a set of memory testing speeds (e.g., a controlling clock speed of 800 MHz, 1066 MHz, 2000 MHz, and/or other speeds), setting the operating speed of the memory in the computing device to the memory testing speed (i.e., setting the controlling clock for the memory to the corresponding speed) and determining if the memory operates reliably as described above. In some embodiments where multiple configuration values are tested during the memory test, the above-described profile may include information related to one or more best available configuration values for the memory from the multiple tested configuration values. For example, when operating speed of the memory is tested, the profile can comprise information related to a highest operating speed at which the memory can be reliably operated.

Startup Operations

In the described embodiments, computing device 100 performs operations for establishing an operating state of computing device 100 upon being started up (e.g., plugged in, switched on, restored from a low-power state, etc.). For example, in some embodiments, at start-up, computing device 100 performs a power on self test (POST), during which processor 102 retrieves firmware known as basic input/output system (BIOS) from read-only memory 110 and executes the BIOS to initialize and test hardware components and establish a low-level operating state of computing device 100. For example, in some embodiments, executing the BIOS causes processor 102 to initialize (identify, test, etc.) a peripheral such as a video card that drives a display for computing device 100, initialize hard disks/mass storage devices, start up a display in the system, perform various tests on the system, discover and initialize other peripheral devices, etc.

After establishing the low-level operating state of computing device, the BIOS directs processor 102 to a location in memory 104-106 where initial program code for operating system 200 is stored so that processor 102 can begin executing operating system 200. Operating system 200 includes program code that, when executed by processor 102, establishes a high-level operating state for computing device 100. For example, operating system 200 may include program code that performs further initialization and tests, starts services/routines, launches programs/applications, etc. to prepare computing device 100 for subsequent use.

As described above, differently than existing computing devices, the described embodiments avoid performing a memory test during the POST operation. Instead, the BIOS is configured to configure memory 104-106 in a default low performance memory operating state during the POST operation without performing the memory test. Generally, the low performance memory operating state uses memory operating speeds, interface bus speeds, access timings, data/control signal flight times, delays, and/or other operating parameters for which the memory is expected to operate reliably. Note that "operate reliably" means to operate within specified ranges for accuracy, errors, and/or other criteria, which can include operating normally or in a standard way (albeit with the above-described settings for the low performance memory operating state). For example, in some embodiments, the BIOS sets an operating speed for memory 104-106 to a default low speed by setting a controlling clock speed for the memory to a frequency such as 800 MHz. In some embodiments, the low performance memory operating state is a lowest performance operating state provided, supported, or otherwise enabled by memory 104-106 and/or processor 102, a motherboard in computing device 100 to which memory 104-106 and processor 102 are coupled, one or more controllers in computing device 100 (memory controllers, etc.) and/or other mechanisms in computing device 100 (other peripherals such as video cards, etc.).

After the POST operation is completed, an operating system, a driver, and/or another software routine in the computing device performs the memory test during or after an operating system start-up. Based on the outcome of the memory test, the operating system, the driver, and/or the other software routine configures the computing device to enable a high performance memory operating state. Generally, the high performance memory operating state uses best available configuration values for memory operating speeds, interface bus speeds, access timings, data/control signal flight times, delays, and/or other operating parameters for which the memory has been determined to operate reliably during the memory test. In some cases, the best available configuration values enable the memory to have the fastest, most efficient (in terms of latency), etc. reliable operation, so that memory operating speed is a highest value, memory access times are the lowest values, etc. based on a profile of the memory's capabilities generated during the memory test.

Note that, in some embodiments, the "best available" configuration values described herein are limited to being included in a certain set of configuration values. For example, computing device 100 may support only certain actual values of configuration values such as memory speeds, i.e., memory speeds may be limited by bus ratios, a clock circuit's capabilities, manufacturer configurations, and/or other limitations of processor 102, memory 104-106, etc. Thus, in these embodiments, the best available configuration values are "best" configuration values from the set of configuration values.

Note that, although embodiments are described in which computing device 100 "avoids" performing a memory test during the POST, in some embodiments computing device 100 performs at least some tests on the memory during the POST. For example, computing device 100 may perform rudimentary tests on the memory to ensure that the memory is available/present, the size of the memory, that the memory is basically functional, etc. However, in the described embodiments, computing device 100 generally does not perform complex memory testing during the POST.

Configuring an Operating State for a Memory in a Computing Device

Figure 3:
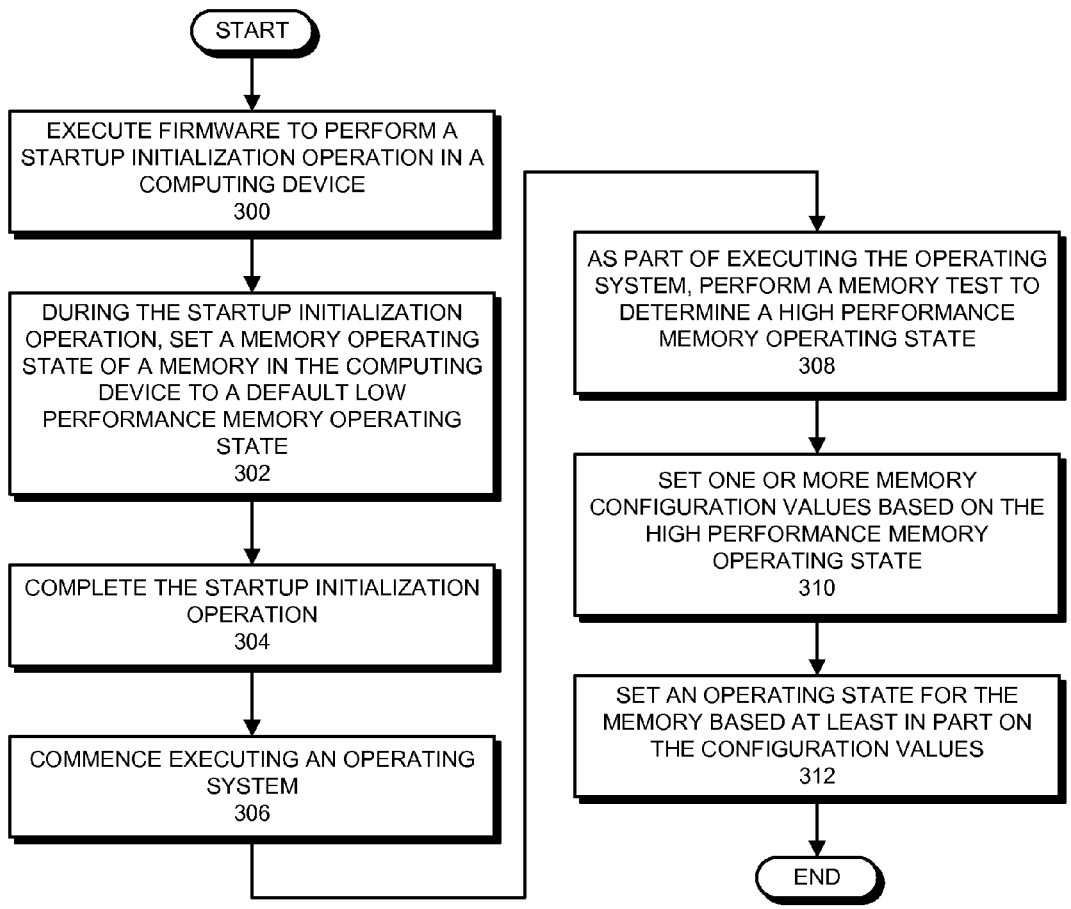
FIG. 3 presents a flowchart illustrating a process for configuring a memory operating state in a computing device in accordance with some embodiments.

FIG. 3 presents a flowchart illustrating a process for configuring a memory operating state in computing device 100 in accordance with some embodiments. More specifically, during the process shown in FIG. 3, after a POST operation, during start-up of operating system 200, driver 202 performs a memory test to determine a high performance memory operating state and sets memory configuration values based on the determined high performance memory operating state. Note that the operations shown in FIG. 3 are presented as a general example of operations performed by some embodiments. The operations performed by other embodiments include different operations and/or operations that are performed in a different order. Additionally, although certain functional blocks and software entities are used in describing the operations (e.g., driver 202, memory controller 116, etc.), in some embodiments, other functional blocks and software entities perform the operations. Moreover, although memory speed is the configuration value that is tested for the memory test in FIG. 3, in some embodiments a configuration value other than and/or in combination with memory speed is tested.

The process shown in FIG. 3 starts when computing device 100 is started up. For example, when computing device 100 is plugged in, powered on, restored from a low power state (sleep, hibernation, etc.). Initially, processor 102 in computing device 100 executes firmware to perform a startup initialization operation in computing device 100 (step 300). In some embodiments, this operation includes performing a POST, as described herein. During the startup initialization operation, processor 102 sets an operating state of memory 104-106 to a default low performance memory operating state (step 302). For example, processor 102 can set a memory operating speed, interface bus speed, access timing(s), data or control signal flight time(s), delays, and/or other operating parameters to values for which the memory is expected to operate reliably. In these embodiments, "operate reliably" means to operate within specified ranges for accuracy, errors, and/or other criteria. For example, the default low performance memory operating state can include configuration values (clock speeds, bus speeds, etc.) set to low enough values that any memory expected to be used in computing device 100 will function within the above-described criteria. Note that the low performance memory state is "default" because the low performance memory state is used without performing memory tests such as in operation 308, below, i.e., is automatically used.

Processor 102 eventually completes the startup initialization operation (step 304). For example, processor 102 can complete the POST and commence executing an operating system (step 306). This can include processor 102 acquiring, from read-only memory 110 (or another source), an initial address in memory 104-106 where program code for operating system 200 is stored and executing the program code for operating system 200. As part of executing operating system 200, e.g., during or after operating system start-up, processor 102 executes program code for driver 202 (e.g., operating system 200 causes processor 102 to execute the program code for driver 202). Driver 202 causes processor 102 to perform a memory test to determine a high performance memory operating state (step 308).

In some embodiments, when performing the memory test, driver 202 sets a value in a configuration register (or other element in computing device 100) to indicate that the memory test is to be performed and then asserts/causes a system management interrupt (SMI). The SMI causes processor 102 to enter a system management mode, thereby causing processor 102 to begin executing the BIOS. The BIOS reads the above-described configuration register and determines that the memory test is to be performed (i.e., that the full BIOS does not need to be run, only the portion that includes the memory test). The BIOS then performs the memory test, as described below.

In some embodiments, performing the memory test comprises configuring/controlling a memory controller 116-118 to perform the memory test (with or without interaction with processor 102, the BIOS, driver 202, etc.). In these embodiments, memory controller 116-118 each include hardware mechanisms (processors, controllers, etc.) that are configured to perform the memory test "in hardware," without relying on software entities in computing device 100. In these embodiments, the memory test is performed by memory controller 116-118 as described below.

In some embodiments, when performing the memory test, driver 202 alone and/or in combination with another software routine performs the memory test described below. Note that, in these embodiments, driver 202 does not assert the SMI and/or use BIOS or memory controller 116-118 to perform the memory test. In these embodiments, some management overhead may be incurred to ensure that memory 104-106 is not used by other software entities and/or hardware entities during the memory test in a way that interferes with the memory test (i.e., that driver 202 is the only one accessing the memory while the test is performed for each configuration value).

During the memory test, for each memory testing speed in a set of memory testing speeds, memory controller 116 or memory controller 118 (possibly under the control/direction of processor 102) set an operating speed of the memory in the computing device to the memory testing speed (e.g., by setting a value in a register that controls operating speed of the memory). For example, memory controller 116 can set a clock that controls the operating speed of memory 104 to a corresponding frequency such as 1333 MHz, 2000 MHz, or another value. (Note that, in some embodiments, each memory controller separately tests the corresponding memory.) Memory controller 116 then collects information representing an operation of memory 104 at the memory testing speed. For example, memory controller 116 can determine whether a specified data value (with all bits set to ones, with all bits set to zeroes, with the bits set to some combination of ones and zeroes) can be written to one or more designated locations in memory 104 and then successfully/correctly read back from the memory at the memory testing speed. In addition, memory controller 116 can collect, record, and/or determine flight times of signals, delays, data/control timing, and/or other information for memory 104.

From the collected information, memory controller 116 can generate a profile for each of the memory testing speeds. The profile can be as simple as a pass/fail that indicates whether memory 104 operated reliably at the corresponding memory testing speed or as complex as including a representation of each piece of collected information. Then, after testing each of the memory testing speeds, based at least in part on the information representing the operation of the memory at each memory testing speed in the set of memory testing speeds (i.e., on the profiles), memory controller 116 determines a high performance memory operating state (step 308). For example, memory controller 116 may use the profiles to determine that the memory operated reliably at 1333 MHz, but not at higher speeds, and determine a corresponding high performance memory operating state—such as an operating state that uses 1333 MHz as the memory speed.

Memory controller 116 then sets one or more memory configuration values based on the high performance memory operating state (step 310). In some embodiments, the one or more memory configuration values control the operation of the memory. For example, in embodiments where a configuration value for memory speed is set by memory controller 116, memory controller may set a processor register (or other location) with a value that represents an upper/maximum value for memory speed. Memory controller 116 may also set other memory configuration values such as data/control signal timing(s), interface bus speeds, etc.

Memory controller 116 then sets an operating state for memory 104 based at least in part on the configuration values (step 312). For example, in some embodiments, memory controller 116 relies only on the configuration values in setting the operating state of memory 104. In these embodiments, memory controller 116 may simply set the operating state for memory 104 based on/corresponding to the configuration values and allow memory 104 to operate accordingly (e.g., at a highest reliable operating speed). As another example, in some embodiments, memory controller 116 may take into account one or more other computing device 100 values such as memory usage, processor 102 load, bus bandwidth availability, peripheral business, etc. when setting the memory operating state based on the configuration values. In some of these embodiments, memory controller 116 may determine, for example, that less power is to be consumed and may therefore set memory speed to a lower value than the value indicated by the configuration values. Thus, in some embodiments, the high performance operating state functions as an upper limit, but does not dictate that the memory must be configured in the high performance operating state.

In some embodiments, when performing a memory test for two or more configuration values, processor 102 may intersperse separate tests for two or more of the configuration values with one or more other non-test memory accesses. In these embodiments, processor 102 may reset memory 104 to the default low performance memory operating state for the one or more other memory accesses, the resetting comprising resuming an operating speed for memory 104 corresponding to the low performance memory operating state. For example, when for memory testing speeds of 1066 MHz and 1333 MHz and a default memory speed of 800 MHz, processor 102 may cause memory controller 116 to perform the test at 1066 MHz and then reset memory controller 116 to 800 MHz so that one or more other non-test memory accesses can be performed. When the non-test memory accesses are completed, processor 102 may cause memory controller 116 to perform the next memory test at 1333 MHz.

In some embodiments, processor 102 (and, more generally, computing device 100) performs the above-described memory test process separately for each memory controller in computing device (e.g., memory controllers 116-118). This is true because the results from one memory controller may not be precisely the same as another memory controller, and so the high performance memory operating state that can be used for one memory controller may be inappropriate for one or more other memory controllers. In these embodiments, one or more operations may be performed to combine the results from the memory test for each memory controller to enable a high performance memory operating state that is appropriate (i.e., results in reliable operation) for all of the memory controllers.

In some embodiments, some or all of the profiles, testing results, etc. from the memory tests are passed to one or more software entities or hardware elements (e.g., operating system 200, application 204-208, processor 102, etc.) to be used as information describing memory 104-106. The information may be used for purposes such as debugging, system profiling, performance monitoring, etc.

In some embodiments, one or more of operating system 200, driver 202, etc. communicates with one or more other drivers, software routines, etc. in computing device 100 (e.g., with graphics drivers, etc.) regarding the configuration values to be used in performing the memory test, the setting of the high performance memory operating state, etc. Generally, in these embodiments, the configuration of memory 104-106 and/or other aspects of the operation of computing device 100 may be performed in accordance with the above-described communication.

In some embodiments, a computing device (e.g., computing device 100 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), controllers, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for configuring a computing device, comprising:
by a processor in the computing device, performing operations for:
executing firmware to perform a startup initialization operation for the computing device, wherein performing the startup initialization operation comprises setting an operating state of a memory in the computing device to a default low performance memory operating state;
after completing the startup initialization operation, executing an operating system, wherein executing the operating system comprises performing a memory test to determine a high performance memory operating state; and
setting one or more memory configuration values based on the high performance memory operating state, the one or more memory configuration values controlling the operation of the memory.

2. The method of claim 1,
wherein performing the memory test comprises, for each memory testing speed in a set of memory testing speeds:
setting the operating speed of the memory in the computing device to the memory testing speed; and
collecting information representing an operation of the memory at the memory testing speed; and
wherein determining the high performance memory operating state comprises:
determining the high performance memory operating state based at least in part on the information representing the operation of the memory at the memory testing speeds in the set of memory testing speeds.

3. The method of claim 2, wherein the memory test is performed by driver software.

4. The method of claim 3, wherein the driver software uses one of a system management interrupt (SMI) or a memory test mechanism in a memory controller to perform some or all of the setting and collecting.

5. The method of claim 2, wherein the setting and collecting for two or more of the memory testing speeds are interspersed with one or more other memory accesses, and wherein the method further comprises:
resetting the memory to the low performance memory operating state for the one or more other memory accesses, the resetting comprising resuming an operating speed for the memory corresponding to the low performance memory operating state.

6. The method of claim 1, wherein setting the one or more memory configuration values comprises updating system state for the computing device to indicate the high performance memory operating state.

7. The method of claim 6, wherein the system state is used along with one or more other factors to set the operating state of the memory.

8. The method of claim 1, wherein performing the startup initialization operation in the computing device comprises initializing hardware devices in the computing device and then causing the executing of the operating system.

9. A computing device, comprising:
a processor;
a memory; and
a memory controller;
wherein the processor, memory, and memory controller perform operations for:
executing firmware to perform a startup initialization operation for the computing device, wherein performing the startup initialization operation comprises setting an operating state of the memory to a default low performance memory operating state;
after completing the startup initialization operation, executing an operating system, wherein executing the operating system comprises performing a memory test to determine a high performance memory operating state; and
setting one or more memory configuration values based on the high performance memory operating state, the one or more memory configuration values controlling the operation of the memory.

10. The computing device of claim 9, wherein, when performing the memory test, the processor, memory, and memory controller perform operations for:
for each memory testing speed in a set of memory testing speeds:
setting the operating speed of the memory to the memory testing speed; and
collecting information representing an operation of the memory at the memory testing speed; and
wherein, when determining the high performance memory operating state, the processor, memory, and memory controller perform operations for:
determining the high performance memory operating state based at least in part on the information representing the operation of the memory at the memory testing speeds in the set of memory testing speeds.

11. The computing device of claim 10, wherein the memory test is performed by driver software.

12. The computing device of claim 11, wherein the driver software uses one of a system management interrupt (SMI) or a memory test mechanism in a memory controller to perform some or all of the setting and collecting.

13. The computing device of claim 10, wherein the setting and collecting for two or more of the memory testing speeds are interspersed with one or more other memory accesses, and wherein the processor, memory, and memory controller perform operations for:
resetting the memory to the low performance memory operating state for the one or more other memory accesses, the resetting comprising resuming an operating speed for the memory corresponding to the low performance memory operating state.

14. The computing device of claim 9, wherein, when setting the one or more memory configuration values, the processor and memory controller perform operations for updating system state for the computing device to indicate the high performance memory operating state.

15. The computing device of claim 14, wherein the system state is used along with one or more other factors to set the operating state of the memory.

16. The computing device of claim 9, wherein performing the startup initialization operation in the computing device comprises initializing hardware devices in the computing device and then causing the executing of the operating system.

17. A non-transitory computer-readable storage medium storing instructions that, when executed by a computing device, cause the computing device to perform a method for configuring a computing device, the method comprising:
- executing firmware to perform a startup initialization operation for the computing device, wherein performing the startup initialization operation comprises setting an operating state of a memory in the computing device to a default low performance memory operating state;
- after completing the startup initialization operation, executing an operating system, wherein executing the operating system comprises performing a memory test to determine a high performance memory operating state; and
- setting one or more memory configuration values based on the high performance memory operating state, the one or more memory configuration values controlling the operation of the memory.

18. The computer-readable storage medium of claim 17, wherein performing the memory test comprises, for each memory testing speed in a set of memory testing speeds:
- setting the operating speed of the memory in the computing device to the memory testing speed; and
- collecting information representing an operation of the memory at the memory testing speed; and wherein determining the high performance memory operating state comprises:
- determining the high performance memory operating state based at least in part on the information representing the operation of the memory at the memory testing speeds in the set of memory testing speeds.

19. The computer-readable storage medium of claim 18, wherein the setting and collecting for two or more of the memory testing speeds are interspersed with one or more other memory accesses, and wherein the method further comprises:
- resetting the memory to the low performance memory operating state for the one or more other memory accesses, the resetting comprising resuming an operating speed for the memory corresponding to the low performance memory operating state.

20. The computer-readable storage medium of claim 17, wherein setting the one or more memory configuration values comprises updating system state for the computing device to indicate the high performance memory operating state, the system state being used along with zero or more other factors to set the operating state of the memory.

\* \* \* \* \*